(12) United States Patent
Takizawa

(10) Patent No.: US 6,625,846 B2
(45) Date of Patent: Sep. 30, 2003

(54) CASTER FOR ROBOT

(76) Inventor: Shigeo Takizawa, 24-5, Shounandai 4-Chome, Fujisawa (JP), 252-0804

(*) Notice: Subject to any disclaimer, the term of this patent is extended or adjusted under 35 U.S.C. 154(b) by 14 days.

(21) Appl. No.: 10/095,183

(22) Filed: Mar. 8, 2002

(65) Prior Publication Data

US 2002/0088083 A1 Jul. 11, 2002

Related U.S. Application Data

(63) Continuation of application No. 09/423,169, filed as application No. PCT/JP99/01085 on Mar. 5, 1999.

(30) Foreign Application Priority Data

Mar. 6, 1998 (JP) ............................................. 10-98084

(51) Int. Cl.⁷ ............................................. B60B 33/00
(52) U.S. Cl. ............................ 16/20; 16/18 B; 180/196
(58) Field of Search ............................ 16/18 B, 20, 32, 16/33, 31 R; 180/183, 196; 248/346.11, 188.8, 188.9; 280/5.24, 8, 10, 11

(56) References Cited

U.S. PATENT DOCUMENTS

| | | | |
|---|---|---|---|
| 1,012,404 A | 12/1911 | Means | |
| 2,698,454 A | * 1/1955 | Meyer | ........................ 16/31 R |
| 3,239,872 A | 3/1966 | Kitrell | |
| 3,623,184 A | 11/1971 | Mazur | |
| 3,646,633 A | 3/1972 | Meinhardt | |
| 3,858,271 A | 1/1975 | Howard et al. | |
| 4,471,508 A | 9/1984 | Seaborg | |
| 5,001,808 A | 3/1991 | Chung | |
| 5,134,753 A | 8/1992 | Rekuc | |
| 5,655,259 A | 8/1997 | Look | |
| 5,911,422 A | * 6/1999 | Carpenter et al. | ............ 280/10 |
| 5,983,452 A | 11/1999 | McGovern | |

FOREIGN PATENT DOCUMENTS

| | | |
|---|---|---|
| JP | 32-6518 | 8/1957 |
| JP | 3-184782 | 8/1991 |
| JP | 2-118053 | 6/1992 |
| JP | 5-221321 | 8/1993 |
| JP | 7-227482 | 8/1995 |
| JP | 7-236670 | 12/1995 |
| JP | 10-98084 | 3/1998 |

* cited by examiner

Primary Examiner—Anthony Knight
Assistant Examiner—Doug Hutton
(74) Attorney, Agent, or Firm—Knobbe Martens Olson & Bear LLP

(57) ABSTRACT

When a solid such as a utensil or a structure thing moves, stability is high, it is suitable for the indoor use, furthermore to provide the caster which can use the foot part of robot walking by the two pairs. A caster is comprised of a rocking shaft which sets up a wheel, a stably supporting leg, a slidably stabilizing plate and wheel, a drive device which rocks a rocking shaft and change an angle of a slidably stabilizing plate, the detection device which detects a change in the angle and the detection devices which detect a change in the increased weight. And stability is higher than the existent caster, the caster with sled for getting over obstacles which can brake without controlling the movement of the wheel of the existent caster and the axle which holds a wheel by the mechanism such as the brake for braking, in other words, a caster for the robot can be made.

5 Claims, 14 Drawing Sheets

Figure 8-1
Figure 8-2
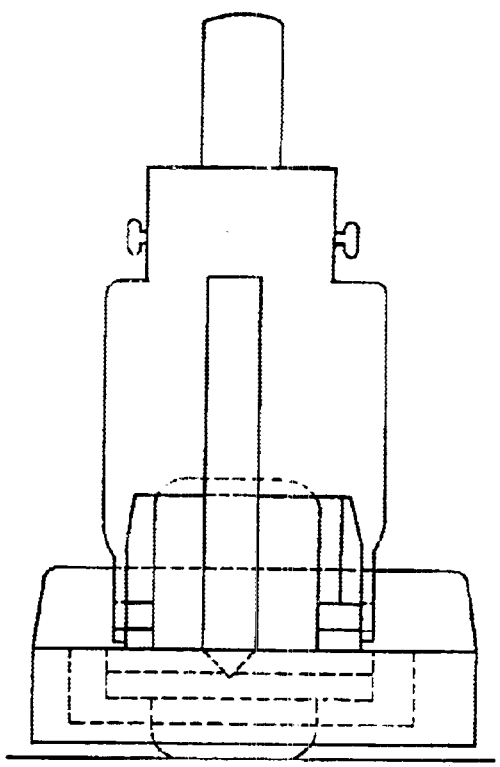
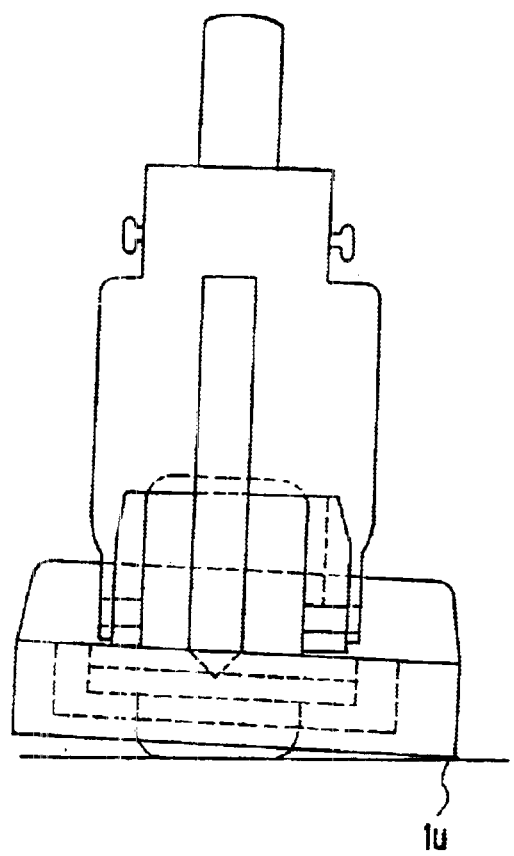
1u

CASTER FOR ROBOT

CROSS-REFERENCE TO RELATED APPLICATION

This is a continuation application of U.S. patent application Ser. No. 09/423,169, filed Nov. 2, 1999, which is the United States National Phase under 35 U.S.C. §371 of International Application PCT/JP99/01085, filed Mar. 5, 1999, which claims priority to Japanese Patent Application No. 10/98084, filed Mar. 6, 1998. The disclosure of the United States Patent Application and the International Application is herein incorporated by reference in its entirety. The International Application was not published under PCT Article 21(2) in English.

BACKGROUND OF THE INVENTION

1. Field of the Invention

This invention improves a caster with a sled for moving over a surface of varying height. The new caster size is smaller than the size of the existent caster since larger wheels are limited by space. If the existing caster is moved by a person or moves freely it is unable to travel over obstacles of varying height along its transit plane.

This invention is for a caster that has higher stability than the existent caster, and whose movement can be controlled without the use of a brake to the wheel and a wheel's axle. In other words, this is an invention of a caster for a robot.

And this is an invention of a caster for a robot which can serve as a foot part of a robot having two feet, because the caster has a sled for traveling over obstacles and thus the robot can stand on itself, by maintaining stabilization by one or two casters each with a sled for traveling over obstacles.

2. Description of the Related Art

Conventionally, for moving any object such as a utensil or a structure, a caster was used as a means to place a wheel on a transit surface. Casters were usually used with three wheels or more because casters could not securely support a load by standing on one wheel or two wheels, and one wheel or two wheels were used when taking advantage of centrifugal force.

When the aforesaid casters are not available for moving solid obstacles such as a utensil or a structure because of obstacles on the transit path, casters that have big wheels or big wheels installed directly in the object were used for traveling over obstacles. When a big wheel isn't available for the surrounding conditions, the existing caster having a small wheel couldn't travel over obstacles.

As a sled has high friction, it is used under conditions such as touching snow having little friction, and it is hard to use the sled in a building because frictional resistance against a floor is too high. When casters were attached to a robot and used, many small wheels were set up in sequence to secure its stability and the wheels were used as a caterpillar. Furthermore, three legs (i.e., three wheels) or more were used for the foot part when use in two wheels was difficult.

This inventor has filed an application for an invention of a walker provided with a caster having a plate at the bottom of a frame body as Japanese patent application JP 7-236670. The above is an example to correct the above mentioned inconvenience in moving with stability inside a building that has an abundance of traversing obstacles such as the edge of a tatami mat or some other types of material. In particular, the above is an invention to correct an inconvenience in that a handicapped person falls down due to the rotation of the wheels and to enable the person to traverse a surface including steps at home.

And this inventor has filed for a caster of which a plate for traveling over steps with stability as Japanese patent application JP 9-92722. And this inventor has filed for a caster that has a plate of which, the gross touching area to the ground is variable due to the adjustable movement of a plate back and forth, up and down, and a change in angle as Japanese patent application JP 10-98084 claiming domestic priority to Japanese patent application JP 9-92722.

JP 64-44301 is an example of an existing caster. Its purpose is to assist a then-existing caster to travel over steps as obstacles by a sled disposed in front of the caster, when this caster rolls over a generally flat surface in the same manner as the then-existing caster. The other purpose of the above application is to control the proceeding direction of a sled and a caster relative to the proceeding direction so that traveling over steps may become possible by pivoting of the caster. At the same time, the realization is attempted by a stopper that secures a sled material to be set up in order to run with rolling on top of a flat surface of a road.

The purpose of JP 64-44301 is mentioned as above. In the embodiment, it is mentioned the drive power is kept by the other wheel that isn't indicated in FIG. 1 of reference example 2. In comparison with the caster in the request of JP 64-44301, the present invention enhances stability by establishing a gross touching area of a plate to the ground.

And the present invention is an invention for controlling the acceleration of a caster by making friction variable by changing the gross touching area to the ground. The present invention is an invention for enabling a caster to stand on a wheel by itself because stability is enhanced by changing the loading point as the wheel moves.

And Japanese Utility Model Application 50-140166 is an example of an existing caster. But it is composed of a link which is attached to the bottom of a weight body, a wheel attached to a middle part of the link and a fixing device that fixes the other end of the link on the bottom with an adjustable distance.

When considering FIG. 1 and FIGS. 4–6 of Japanese Utility Model Application 50-140166, it is seen that the purpose of the caster is to lift the weight body to the height desired. The caster of Japanese Utility Model Application 50-140166 is combined with other structures to enhance stability and secure high stability by independently adjusting the height of each individual wheel.

In contrast, the present invention enhances stability by making a plate that is designed for the gross touching area to the ground. The present invention controls acceleration of the caster by changing the gross touching area to the ground. In other words, the present invention controls acceleration by a change in pressure exerted on a part of a plate that touches the ground. In other words, the present invention controls acceleration by changing the form of the touching part of a plate to the ground.

Additionally the present invention enhances stability by changing the loading point of a wheel due to a front and back motion while maintaining its function as a wheel. In comparison with the caster of Japanese Utility Model Application 50-140166, the present invention is totally different.

This is a new invention due to the fact that it is able to support a structure with a single wheel and provide motion of a structure due to its high stability.

In this inventor's application of JP 7-236670, a hole in the plate enables a rotating wheel's surface to easily touch the floor. Therefore the movement of the walker as well as a person's movement is made smoother due to the wheel reducing the friction between a plate and the floor. As mentioned above, the wheel's surface easily touches the floor. There is neither an idea of the front and back movement nor an idea of the up and down movement of the wheel. There is no idea to control the change of acceleration by making the gross touching area of the plate to the ground adjustable due to the movement of the wheel's position.

There are descriptions that a part of the plate is shaped so that the plate can touch the ground at the bottom, and the inconvenience that any changes in direction or movement could not be performed easily due to excessive friction was eliminated. However, there is no way to control the friction or the change of variable acceleration by adjusting the gross touching area of the plate to the ground.

In contrast, the present invention realizes as new ideas the following characteristics: The present invention can control acceleration by making friction variable due to its ability to make the gross touching area to the ground of a plate adjustable. And then, in the condition that an angle of inclination of a plate is unchanged, friction of the plate to the ground area is controlled in the condition that the plate and a wheel are touching the ground area. And then it is able to change the contact pressure of the ground to the plate into the condition that a wheel doesn't touch the ground area due to the change of an angle of inclination of the plate.

Also it is able to assemble a propulsion device that is able to make the angle of inclination of the plate change. If an angle of inclination of the plate is changed, it is detected by a detection device. The device outputs detection data for detecting changes in angle of inclination of the plate.

SUMMARY OF THE INVENTION

This invention is composed of a plate that can change an angle of inclination, a supporting leg structure which is provided on the plate, a wheel, and a rocking shaft that connects the wheel and an upper object which can rock in the space from the front to the back on the plate with an angle of inclination. The plate can be shaped by a material that has a flexible quality. And the gross touching area of the plate to the ground can be changed when the plate has a flexible quality.

And also a friction material can be set up in a plate. The friction can be varied by using a friction material. A touching pressure to the ground that is exerted on a touching part of the plate can be varied.

It is possible to maintain a propulsion device that can change an angle of inclination of this plate. It is also possible to maintain a detection device for an angle of inclination of this plate changing. It is further possible to output detection data detected by the detection device for changes in angle of inclination of the plate.

The rocking shaft can rock front to back in a space on the plate and be assembled a propulsion device that can change an angle to turn the rocking shaft. The rocking shaft can be equipped with a detection device for detecting the rocking of the rocking shaft and outputting detection data. The wheel is arranged in a hole that is established in the plate and can be moved in this hole in the front and back directions and also in the up and down directions.

It is possible that either of the first flange or the second flange is provided on the tip side or on the rear side of the plate. It is possible that the first flange is configured to be approximately ⅓ of the entire length of the plate, and the second flange can be configured to have a smaller radius than the first flange. The plate is able to maintain an angle of inclination in the left to right directions and to arrange an angle of inclination that can be changed.

BRIEF DESCRIPTION OF THE DRAWINGS

FIG. 6-1, FIG. 6-2 and FIG. 6-3 are side views that show the conditions of a plate that touches the ground.

FIG. 7-1 and FIG. 7-2 are side views that show the conditions of the touching part to the ground of the wheel.

FIG. 8-1 and FIG. 8-2 are rear views that show the conditions of the touching part of the plate to the ground.

DETAILED DESCRIPTION OF THE PREFERRED EMBODIMENT

Figure 1:
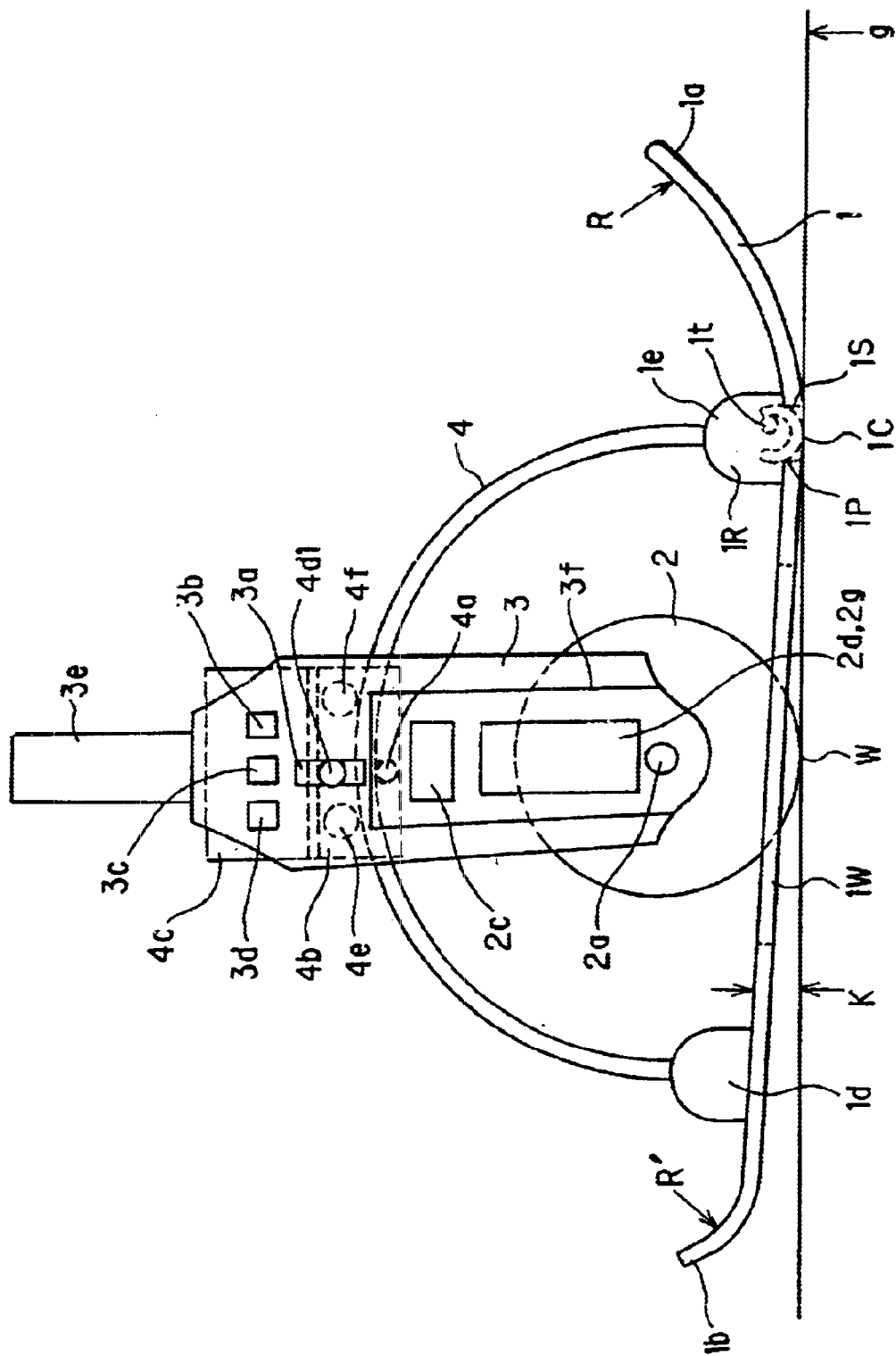
FIG. 1 is a side view showing substantial parts of the first embodiment of a desirable caster for a robot.

The inventor describes the first embodiment that is a desirable caster for a robot in accordance with FIGS. 1 to 9 and FIGS. 12 to 14 in order to describe this invention in detail.

A plate (1) is formed by using materials such as strong plastics, metals and other materials. And the plate (1) has the first flange (1a), which the tip side is raised in a big bend radius (R) to roughly ⅓ of the entire length and the plate (1) has the second flange (1b), which has a bend radius (R') that is a smaller bend radius than the first flange (1a) in the rear side.

And the first flange (1a) is shaped under the condition that it is rising from a transit plane (g) based on the touching part to the ground (1c) of the plate (1). And then the plate (1) is shaped and raised in the back from the touching part to the ground (1c) at an angle of inclination to the back (K) which can be of various degrees such as three degrees.

In this embodiment, an arch (4) of which the center is a point of a wheel that touches the ground (w) is roughly a semi-circle whose radius is a distance to an arch upward supporting member (4a). The member can rotate freely to make an angle of the arch (4) change. The member can then rotate freely to make an angle of a shaft outside cover (3) change.

Figure 2:
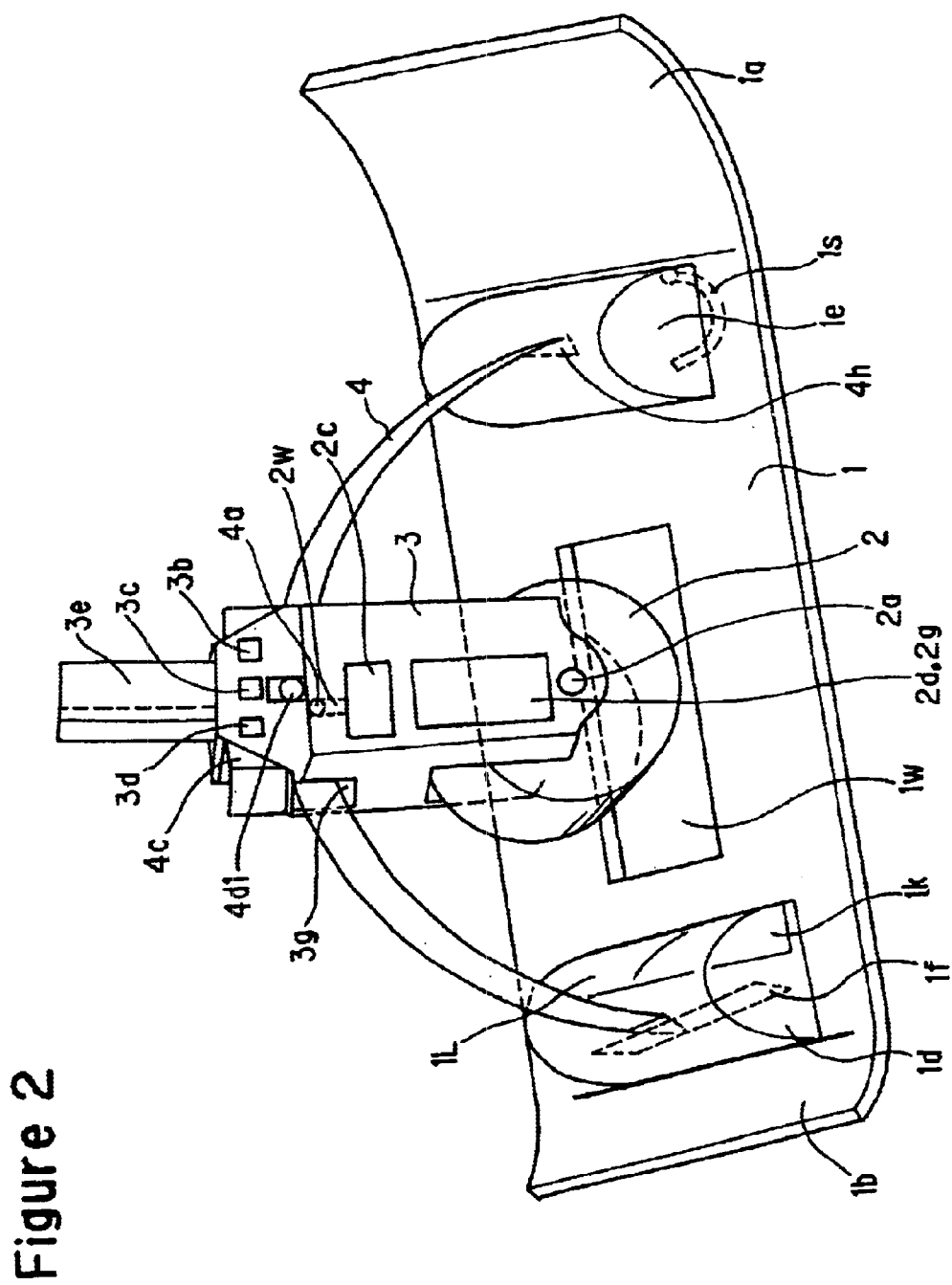
FIG. 2 is a perspective view that shows substantial parts of the same embodiment.
Figures 1, 6:
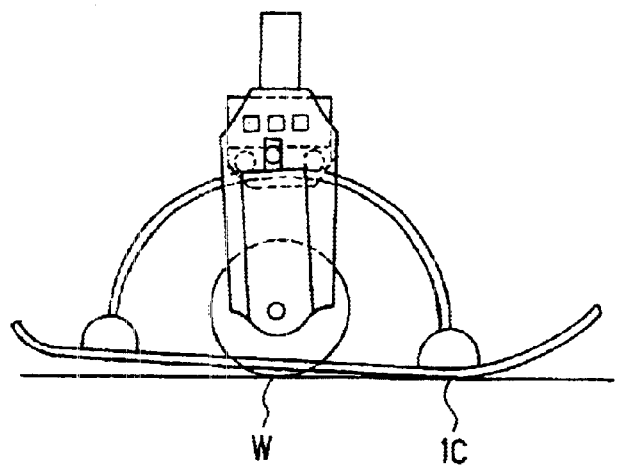
Figures 2, 6:
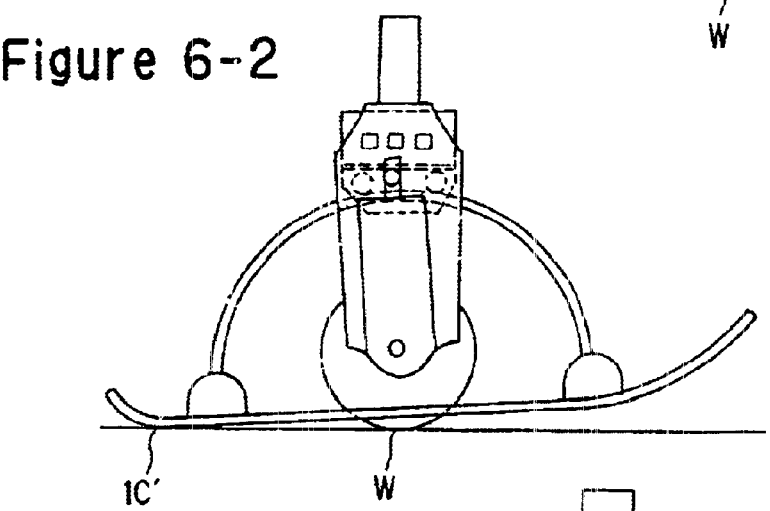
Figures 3, 6:
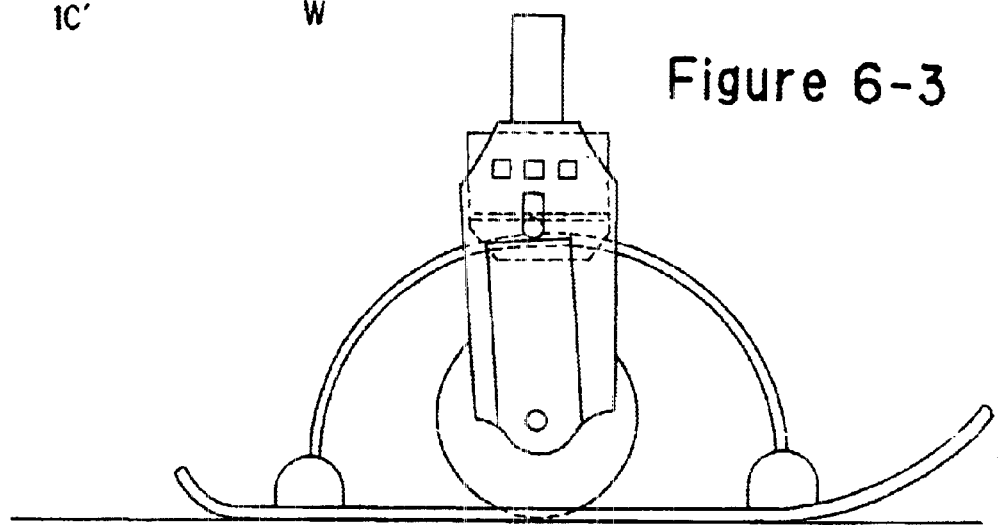
Figure 12:
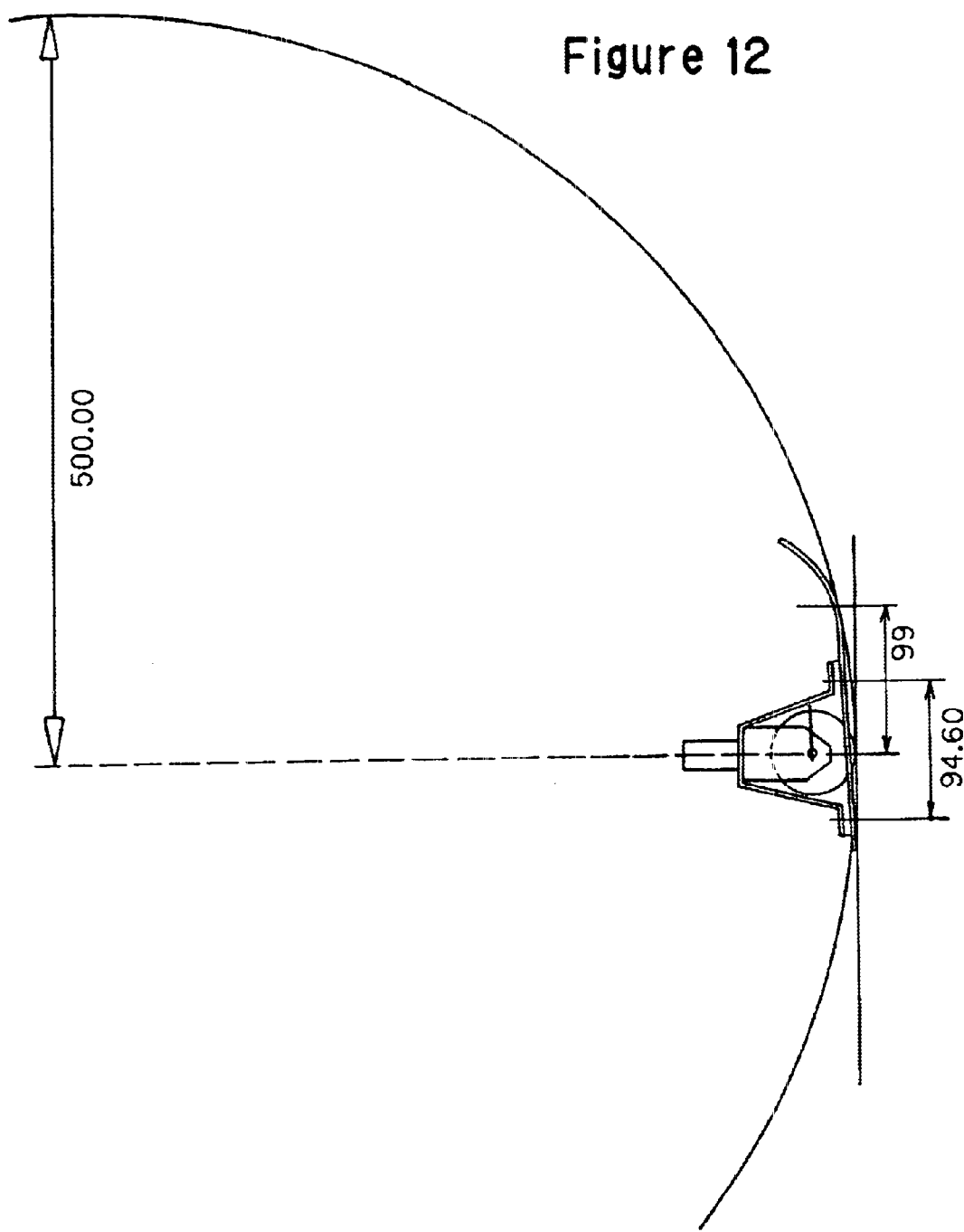
FIG. 12 shows a general idea of how to compute the wheel size by measuring the distance between two points, which are the part that touches the ground of a big wheel and the first point to touch an obstacle.

The plate (1) is configured to freely rotate around the point of the wheel that touches the ground (w) as a pivot as shown in FIG. 6-1, FIG. 6-2, and FIG. 6-3. Although an angle of inclination to the back (K) can be set based on the distance of the point of the wheel that touches the ground (w) and the touching part to the ground (1c), it is made roughly at three degrees in this embodiment. This angle is to realize the effect of a big wheel as shown in FIG. 12, depending on the distance between the point of the wheel that touches the ground (w) and the rear touching part to the ground (1c′), and the height of the wheel as shown in FIG. 6-2.

It is sufficient to provide the touching part to the ground (1c) and the rear touching part to the ground (1c′) at a fixed angle in order to control the speed using the pressure caused by changing the angle of the plate. When the plate touches the ground, the wheel rises from the ground if a much stronger rotation pressure is applied to the plate, so that all the driving force of the wheel becomes zero. Therefore it means that the pressure and/or the friction at the touching part to the ground (1c) dictate the strength of braking power.

Figure 3:
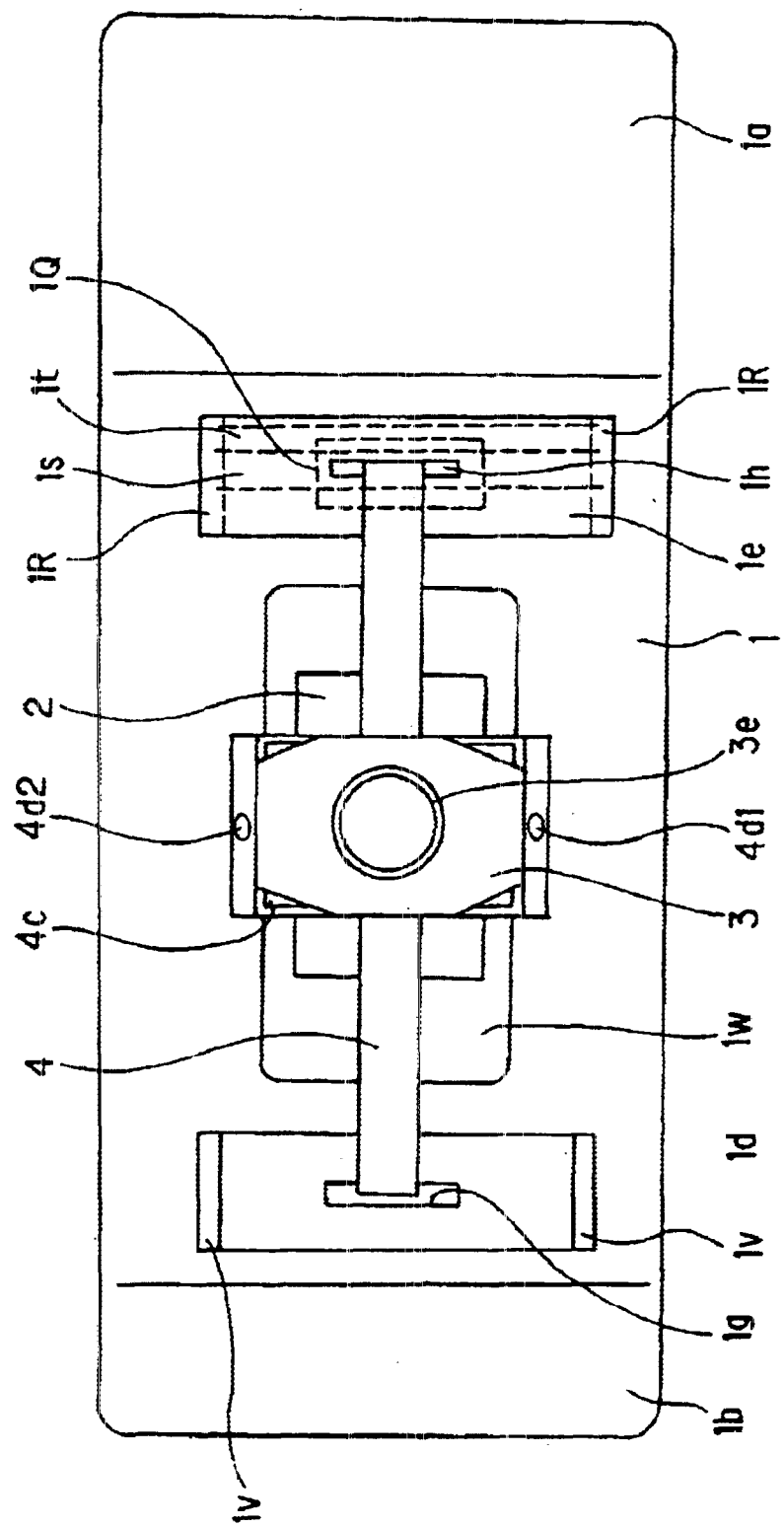
FIG. 3 is a plan view that shows substantial parts of the same embodiment.
Figure 4:
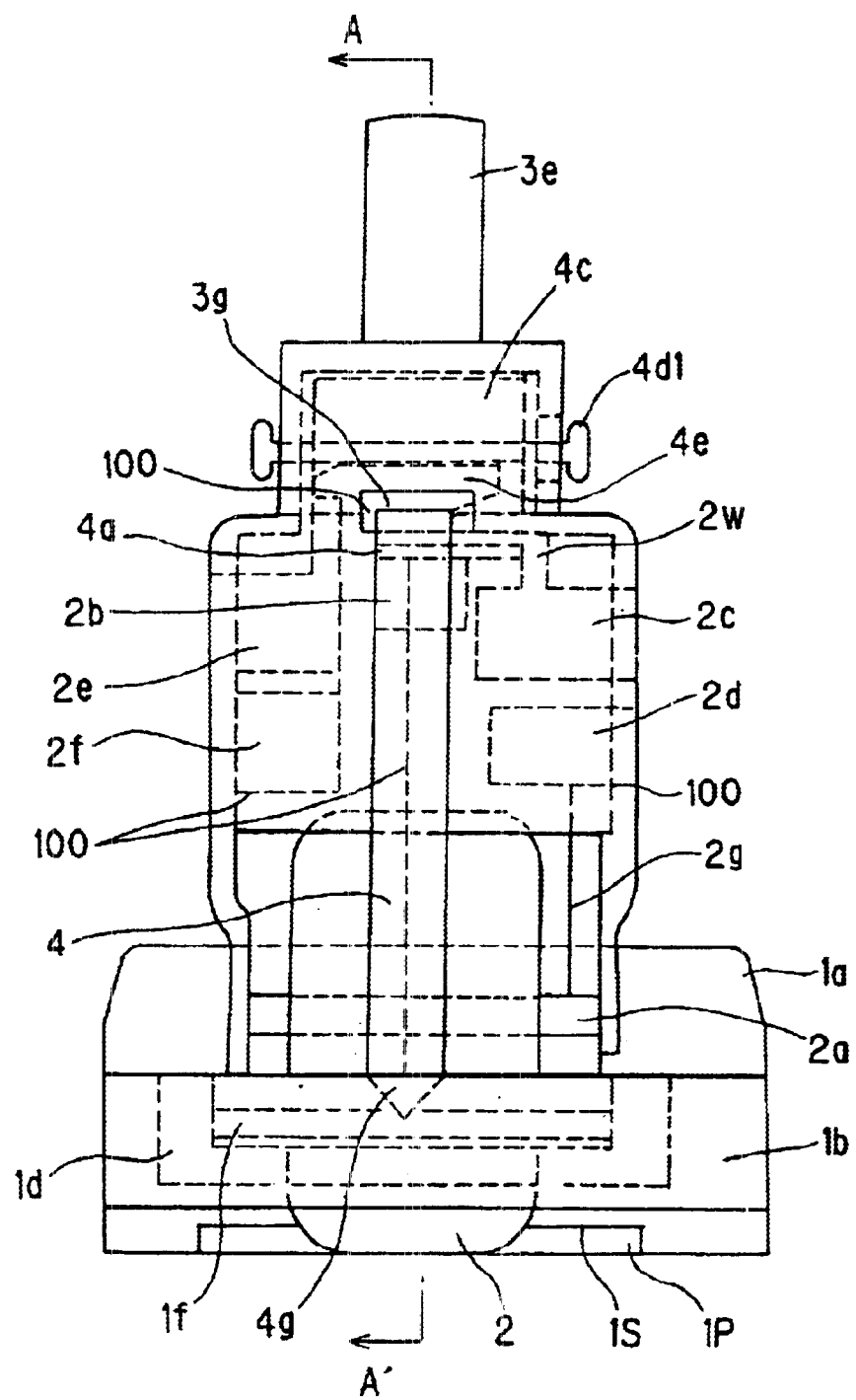
FIG. 4 is a rear elevation that shows substantial parts of the same embodiment.
Figure 5:
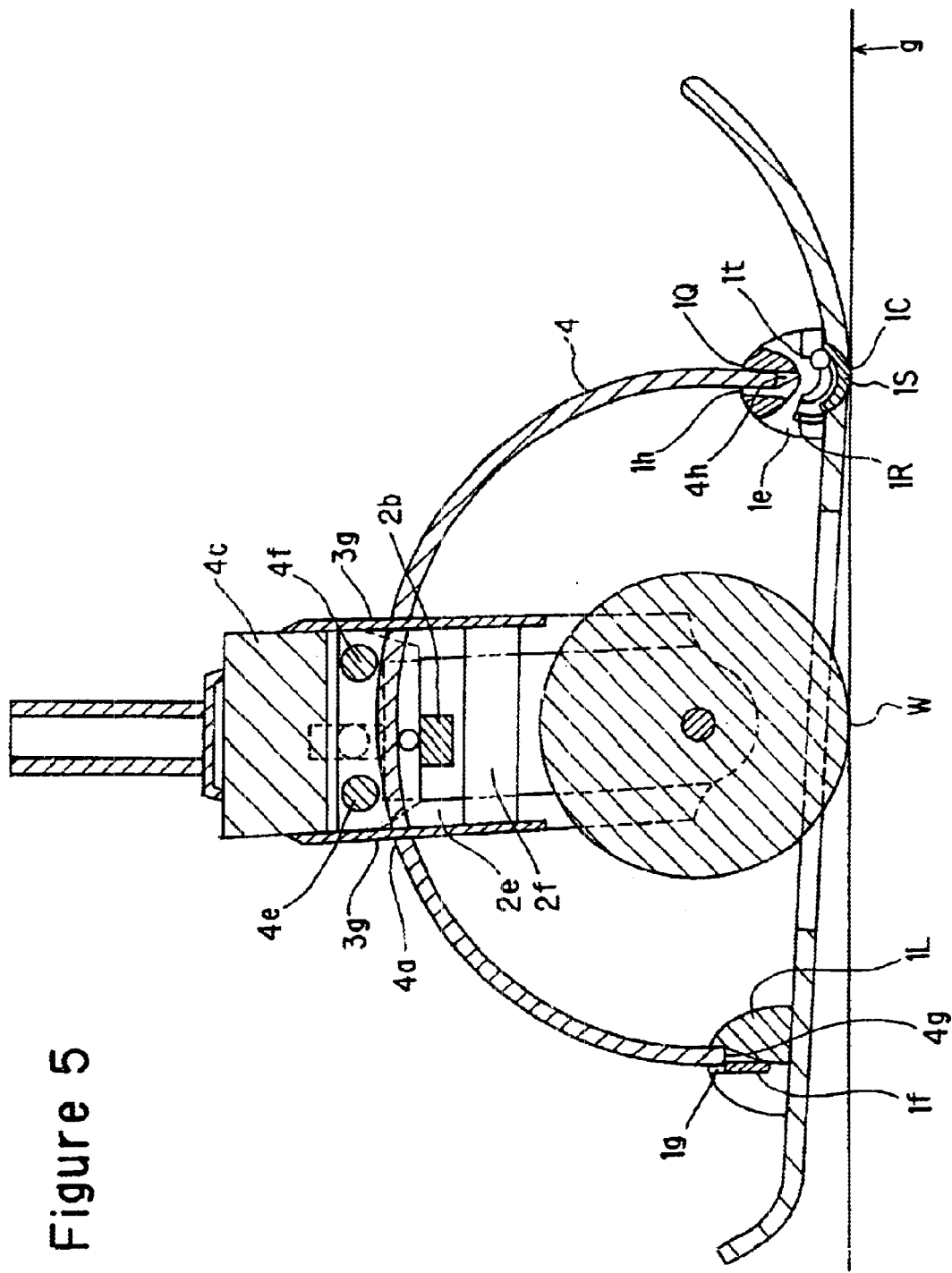
FIG. 5 shows an A–A' cross section that is shown in FIG. 4.

Although it isn't illustrated, it is the same as for the rear touching part to the ground (1c′) as well. FIG. 6-3 is particularly an assumption figure that pulled up a wheel after the plate became parallel to a transit plane, therefore the stability in proportion to the size of the area at the bottom of the plate is provided. The braking of the caster becomes possible by changing the angle of the plate in this way.

Figures 1, 7:
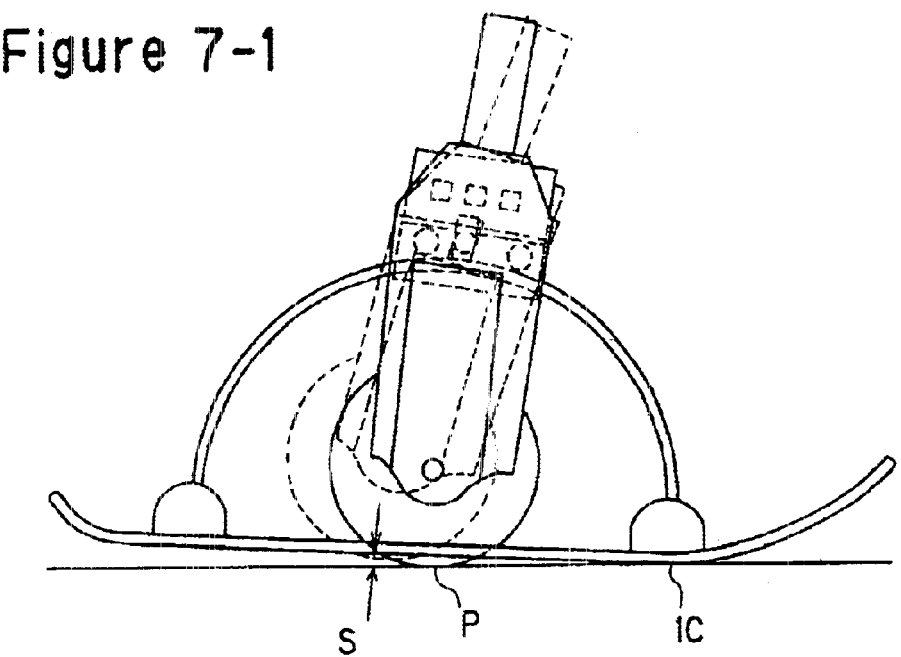
Figures 2, 7:
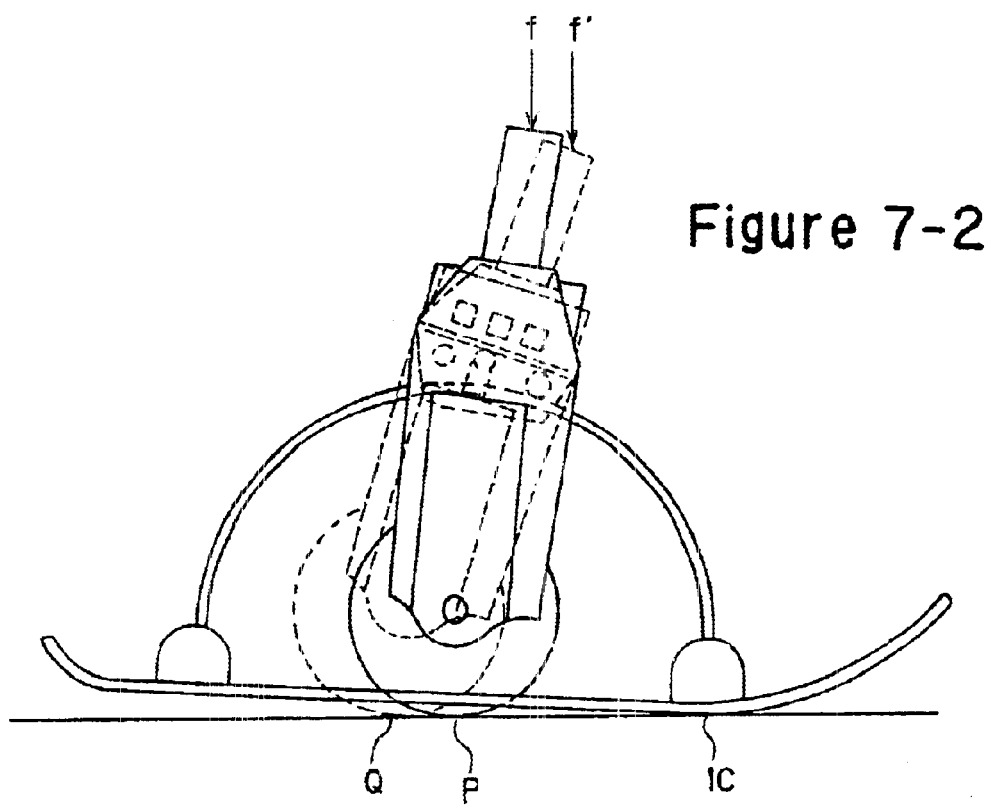
Figure 9:
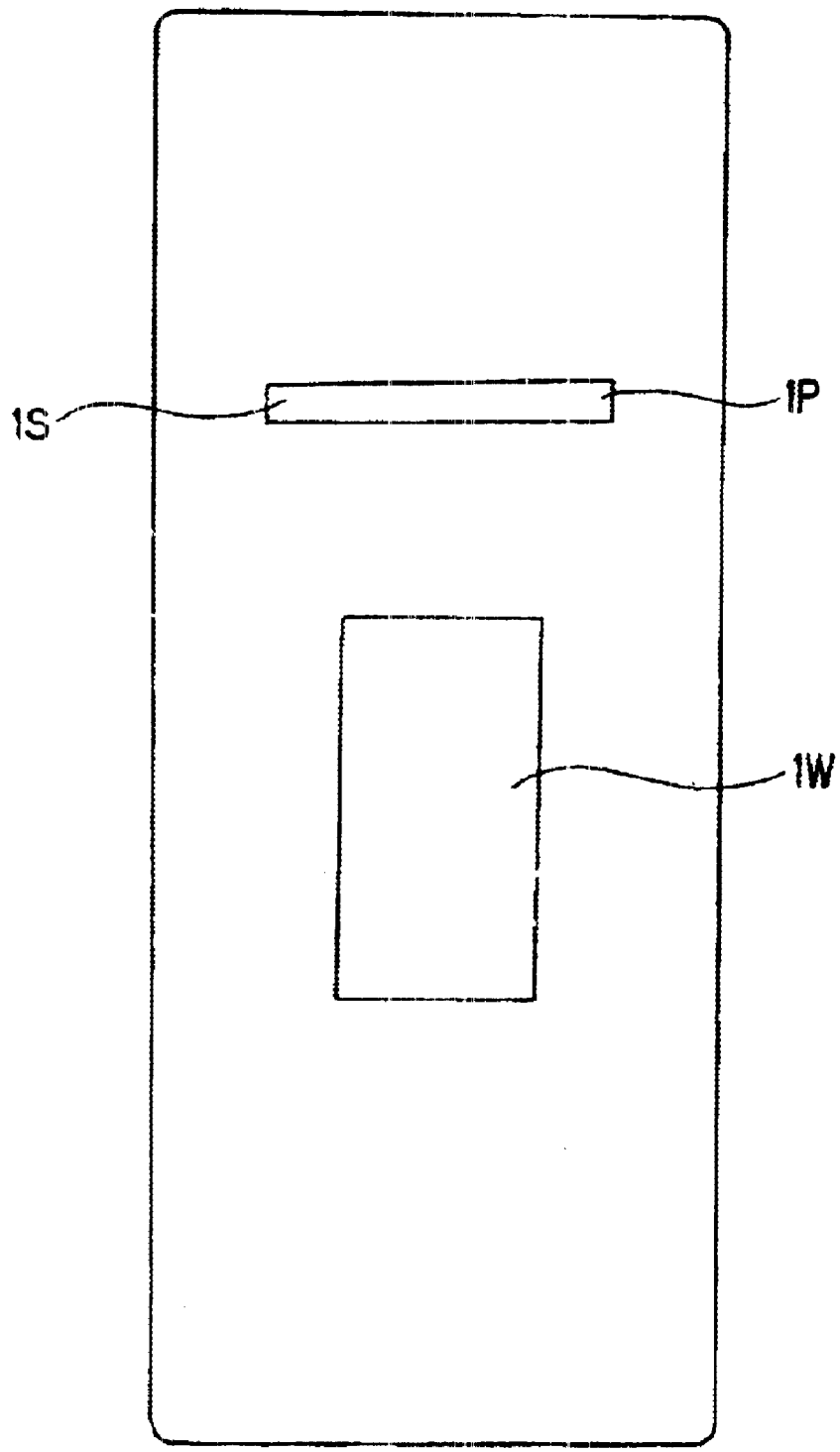
FIG. 9 is a reference figure of this invention, which shows an opening for friction of a plate and also shows a part of the friction material.

FIG. 7-1 and FIG. 7-2 show the conditions where a rocking shaft rocks. They show the position of the wheel that can be changed in front and back depending on the rocking of the rocking shaft when shaft-cover connecting screws (4d1, 4d2) are made in the center of rocking.

When the wheel is further moved from the touching point of the ground of the wheel (p) that is located under the sloped rocking shaft by the movement in the front and back depending on the rocking of the rocking shaft, the space(s) between the part that touches the ground of the wheel under the sloped rocking shaft and the point of the part that touches the ground of the wheel moved is/are displayed as shown in FIG. 7-1.

By this, when rotation pressure increases much more toward the rocking shaft, the wheel rises. Therefore all the driving force by the wheel becomes zero. The pressure in the touching part to the ground (1c) and/or friction prescribes the strength of braking power.

And also an up-down movement of the rocking shaft or the wheel is necessary to touch the touching point of the ground of the wheel (Q), which moves under the sloped rocking shaft that is located by the movement in front and back caused by the rocking of the rocking shaft from the touching point of the ground of the wheel (p) under the sloped rocking shaft that touches the ground.

A loading point by rocking of the rocking shaft can be moved between the touching point of the ground of the wheel (p) under the sloped rocking shaft and the touching part to the ground (1c), as shown by loading shaft (f) and loading shaft moved (f) in FIG. 7-2. As for this embodiment, although it isn't shown, a movement of the loading point is detected and it can be outputted.

Even if a wheel is being fixed in the point of the wheel that touches the ground (w) as shown in FIG. 6-1, FIG. 6-2 and FIG. 6-3, a loading point can be moved between the point of the wheel that touches the ground (w) under a sloped rocking shaft and the touching part to the ground (1c). And also the plate (1) is shaped roughly in a size of 10 cm in width, a length of 28 cm, and a thickness of 5 mm for the stability of the movement.

A hole (1w) is maintained roughly in the center of the bottom of the plate (1) so that bottom of the wheel (2) touches the ground at the point of the wheel that touches the ground (w). The wheel (2), which is maintained by using an axle (2a) with a shaft outside cover (3) that maintains free rotation in an arch (4) goes through the hole (1w). An arch end-supporting member (1e) is in the mid-air inside and is set up near the upper surface of the first flange (1a), and an arch end-supporting member (1d) is in the mid-air inside and is set up near the upper surface of the second flange (1b). Both of the cases are maintained as a complete unit of a plate (1).

An opening (1h), of which the size is such that the arch (4) can be swung right and left and is set up approximately in the center of the arch end-supporting member (1e). A cover (1v) on either side of the arch end-supporting member (d) and can be opened or closed. An opening (1g) is set up approximately in the center of the arch end-supporting member (1d), whose size is such that the arch (4) can be swung right and left.

The arch (4) goes through the opening (1h) in the front and goes through the opening (1g) in the back. The arch (4) that went through an opening (1g) is installed in a plate angle detection device (1f). And then the arch (4) is joined in left-right free rotation on the bottom of the arch end-supporting member (1d), namely on the surface of the plate (1) and at an arch end contacting part (4g). The arch (4) that went through the opening (1h) is joined in left-right free rotation at an arch end contacting part (4h) and is joined to a load transducer (1Q) that is suspended from the top of an arch end-supporting member (1e).

Both a battery storage compartment (1L) and a side to side adjustable motor (1k) in the arch end-supporting member (1d). The rotation by a side to side adjustable motor (1k) is communicated to an arch end contacting part (4g) and then moves the plate (1) up and down in a sideways motion. An angle of the plate (1) can be changed by the up and down sideways motion of the shaft (3e) due to the plate (1) being rotated by the side to side adjustable motor (1k) in the pivoting of both the arch end contacting part (4g) and the arch end contracting part (4h).

When there is no up-down movement of either the plate or the wheel in the caster for a robot and it is located in a parallel position to a transit plane (g) by changing an angle of the plate's (1) sideways motion, the plate (1) is designed such that a touching part to the ground (1u) of the plate (1) can be configured as shown in FIG. 8-2 from the condition of only a wheel touching the ground as an existent caster as shown in FIG. 8-1.

High stability can be maintained because the side's entire length of the touching part to the ground (1u) of the plate (1) touches the ground as shown in FIG. 8-2. Although the position of the wheel can change up and down in the first embodiment, even when it doesn't change up and down high stability can be maintained by changing an angle of the plate (1) up and down in a sideways motion as shown in both FIG. 8-1 and FIG. 8-2.

A friction material-supporting member (1R) is set up respectively on both sides (left-right position) of the arch end-supporting member (1e). And then by securing both sides to the friction material-supporting member (1R), the friction material (1s) goes through a bottom opening (1p) and touches the ground at the touching part to the ground (1c) of the plate (1).

The friction material (1s) is molded in a half-circular arc-shape and uses such materials as a strong plastic, metal such as steel or other materials for example. The length can be stored in the arch end-supporting member (1e). One side of the friction material (1s) has the smooth surface where there is little friction. And for example another side of the friction material is made by a part that has a file-textured surface.

The variable friction part of the friction material (1s) touches the ground through the bottom opening (1p) gradually by rolling at the touching part to the ground (1c). When the strong frictional part of the friction material (1s) touches the ground at the touching part to the ground (1c), strong friction can be achieved and the speed is slowed down.

When the low friction part of the friction material (1s) touches the ground at the touching part to the ground (1c), it has minimal influence on the speed due to a small amount of friction applied by the smooth surfaces that touch each other. In this way, changing the friction part of the friction material (1s) can slow the speed down.

A friction material adjuster (1t) is maintained by a friction material-supporting member (1R) and is a propulsion device that is made to turn the friction material (1s). As for this embodiment, the motor is used and electric power is supplied by a battery storage compartment (1L). Any kind of propulsion device is good if the friction material (1s) can be moved. Although an arch end-supporting member (1d) and the arch end-supporting member (1e) are designed as a complete unit of the plate (1) in the above, it is also good that it is not a single complete unit.

The wheel (2) meets the transit plane (g) at the point of the wheel that touches the ground (w) of the wheel bottom The wheel (2) is supported by the arch (4), the shaft outside cover (3) and an axle (2a) of the wheel (2) in the position where it went through the hole (1w), and at the back side of the touching part to the ground (1c) of the plate (1) positioned roughly at the bottom of the first flange (1a) of the plate (1). The shaft outside cover (3), the wheel (2) and the axle (2a) can accommodate a motor, an engine, and a drive mechanism such as a magnetic drive mechanism. But, in this embodiment, a battery (2c), a motor (2d), and a transmission mechanism (2g) are being used. And also it can be driven by external electrical power.

The shaft outside cover (3) is used and made from materials such as strong plastics, metals such as steel or other materials to assemble both the wheel (2) and the arch (4). The shaft outside cover (3) is made of a divided mid-air structure, in which parts can be roughly a rectangle, is shaped with a strengthening plastic or metal and so on, is shaped by a material that can support the load of an object such as a utensil or a structure from a shaft (3e) and is a structure that the plate (1) can be installed through the arch (4).

The battery (2c), the motor (2d), the transmission mechanism (2g), a shaft angle detection device (2b), a motor (2w) that provides power to change an angle of inclination of the plate (1) maintaining with the arch (4), an arch upward supporting member (4a) that changes an angle of inclination of the plate (1) and an angle of inclination of the shaft outside cover (3) to the plate (1) by getting the power to change an angle of inclination of the plate (1) from the motor (2w) to rotate the arch (4), an oil tank (4c) for oil pressure by an oil pressure pump (2e), a diaphragm (4b) to go up and down caused by oil pressure from an oil pressure pump (2e) by using oil from an oil tank (4c), a shaft-cover connecting screws (4d1, 4d2) that join the shaft outside cover (3) and the diaphragm (4b) so that the diaphragm (4b) can be moved up-down, a control device (2f), an arch downward supporting member (4e) and an arch downward supporting member (4f) can be stored in the shaft outside cover (3).

A hole (3g) is opened respectively in the front side and the rear side of the shaft outside cover (3) so that the arch (4) can go therethrough and the hole's (3g) size does not interfere with an up-down movement of the arch (4). An up-down movement adjustment hole (3a) is opened in the side of the shaft outside cover (3). An outside information input terminal (3b), an electric power jack (3c), and an outside information output terminal (3d) are shaped on the upper side of the up-down movement adjustment hole (3a) of the shaft outside cover (3).

The arch downward supporting member (4e) and the arch downward supporting member (4f) keep the arch (4) in a moving position where the arch is rotated by the arch upward supporting member (4a) and then changes the position by oil pressure obtained from the oil pressure pump (2e). Although a strengthening rib (3f) strengthens the shaft outside cover (3), it isn't necessary. Although an electric power jack (3c) is used to supply electric power in order to use a motor, it can be modified by any kind of a power source.

Although each of the outside information input terminal (3b) and the outside information output terminal (3d) sets up one jack for 2 lines, any form such as 10Base-T is good. Although a fuinction of the diaphragm (4b), the arch downward supporting member (4e) and the arch downward supporting member (4f) are made possible by oil pressure, water pressure or air pressure also can be used to adjust the volume. Although the diaphragm moves up and down and is set in this embodiment, even when it doesn't move up and down, it is also possible that the device concerned with an up-down movement isn't installed, because the purpose of this invention can be made possible by changing pressure to the transit plane (g) of the plate (1) at the touching part to the ground (1c).

For example, the arch (4) made of materials such as strong plastics, metals such as steel or other materials is a circular arc that has a radius to the arch upward supporting member (4a) as the point of the wheel touches the ground (w) at a wheel's pivot point under the condition that a shaft (3e) stands upright. As for this embodiment, the arch (4) can rotate exactly therefore the inside of the perimeter makes a file-shaped form. Anything is good if it can transmit the rotation of an arch upward supporting member (4a) exactly such as a gear structure, a structure of a chain or other structure and then if it is a structure that can change an angle of inclination of the plate (1) and an angle of inclination of a shaft outside cover (3) toward the plate (1) that allows an arch (4) to move.

A control device (2f) that is composed of a microcomputer inputs and outputs through a data transmission network (100). An outside information input terminal (3b), a shaft angle detection device (2b), a plate angle detection device (1f) and a load transducer (1Q) are connected with a data transmission network (100) on the input side. On the other hand, the outside information output terminal (3d), the friction material adjuster (1t), the side to side adjustable motor (1k), the motor (2w), the arch upward supporting member (4a), the motor (2d), the transmission mechanism (2g) and the oil pressure pump (2e) are connected with the data transmission network (100) on the output side.

The shaft angle detection device (2b) uses an incline transducer. The plate angle detection device (1f) uses an incline transducer. The load transducer (1Q) evaluates weight changes and when there is a change, the change is outputted. Both the friction material adjuster (1t) and the side to side adjustable motor (1k) are motors. Anything is good as a mechanism, so long as it can be driven.

The motor (2w) and the arch upward supporting member (4a) are configured to make the arch (4) rotate, therefore if an angle of the arch can be changed, the motor and the rotation transmission device can be designed to attach an outside housing and also the rotation transmission device can be attached to operate by hand. The motor isn't necessarily required. The motor (2d) and the transmission mechanism (2g) are configured to drive the wheel (2), therefore these devices can be designed as attachments to an outside housing, but are not required.

The oil pressure pump (2e) is designed to make the diaphragm (4b) move up and down by oil pressure and direct pressure to the arch downward supporting member (4e) and the arch downward supporting member (4f), but are not required. In the case, the top of the arch (4), the arch downward supporting member (4e), and the arch downward supporting member (4f) are structures that are easy to turn because of their smooth structures and also they can be secured while standing still, because there are both the arch downward supporting member (4e) and the arch downward supporting member (4f) at the top of the arch (4).

For example, the arch downward supporting member (4e) and the arch downward supporting member (4f) press down the top of the arch (4) powerfully by using a suspension type of spring. Anything is good that the arch (4) is easy to turn and also the structures can be secured even when standing still. The top of the arch (4), the arch downward supporting member (4e), and the arch downward supporting member (4f) are smooth structures, are easy to turn, and also can be secured when standing still provided.

Figure 13:
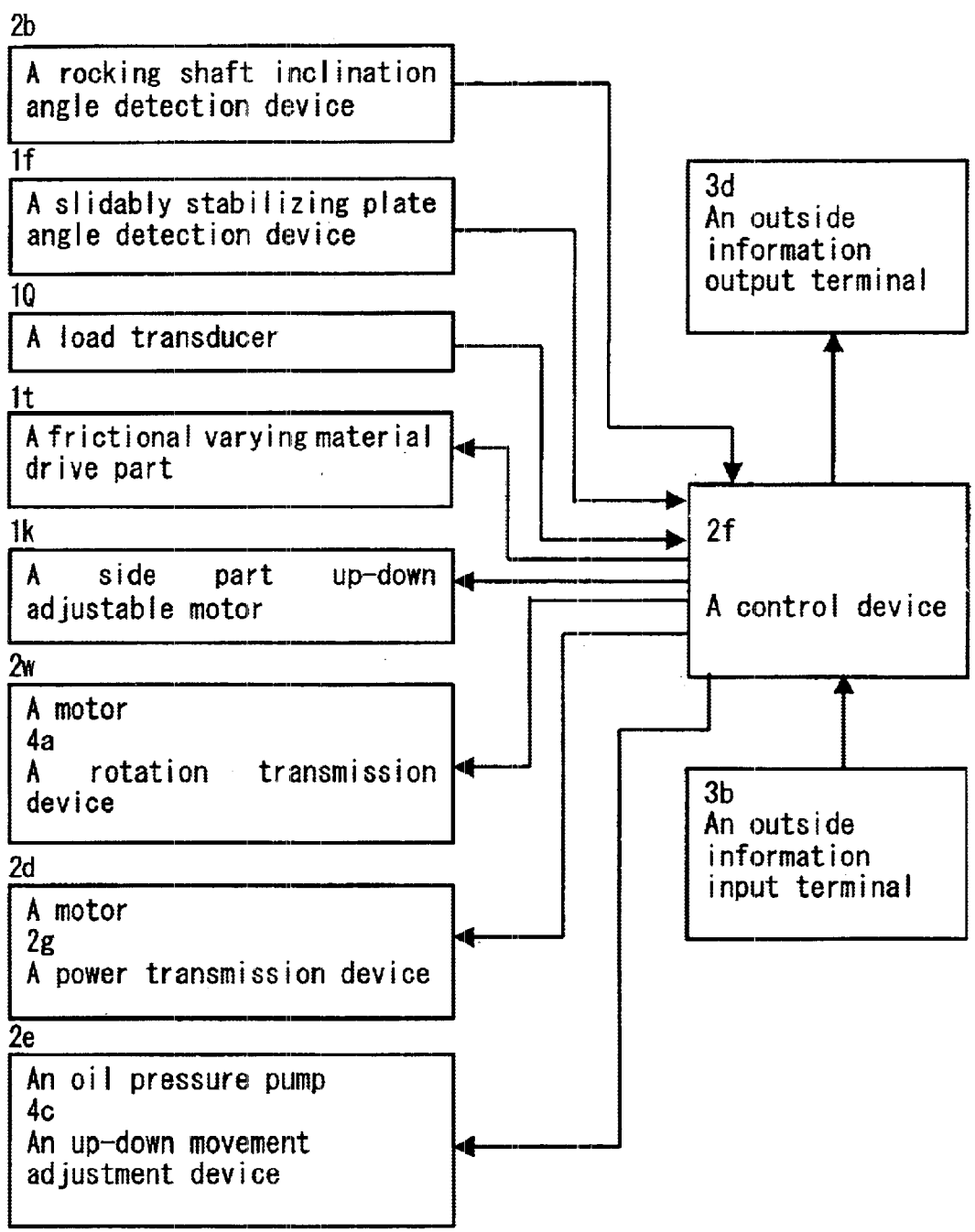
FIG. 13 is a control circuit in the first embodiment.
Figure 14:
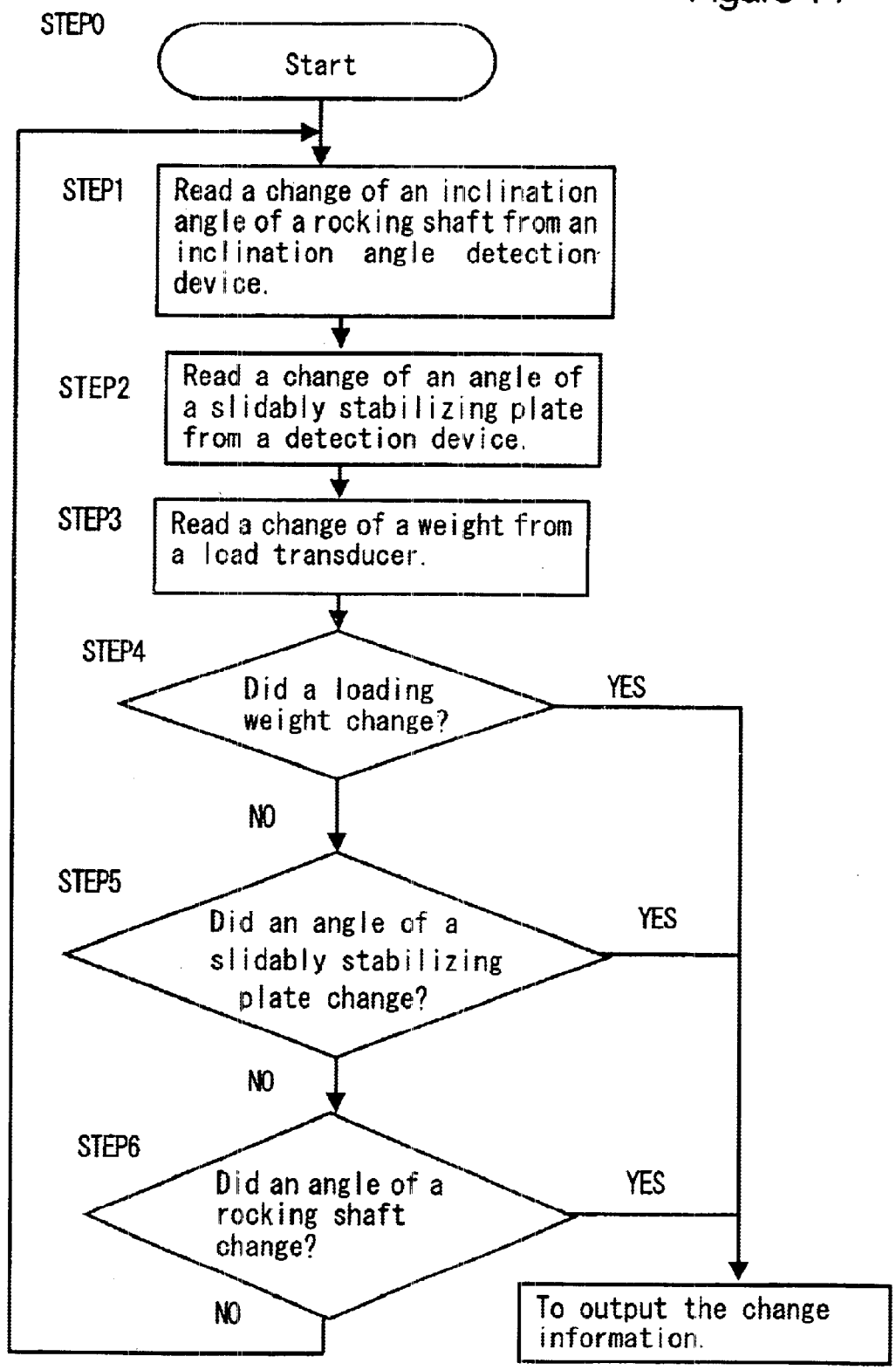
FIG. 14 is a flow chart for a case when the connection of the propulsion device and the plate, and the connection of the propulsion device and the rocking shaft are being cut in the first embodiment.

If the arch downward supporting member (4e) and the arch downward supporting member (4f) press down the top of the arch (4) powerfully by using the suspension spring and if the arch (4) is easy to turn and the structures can be secured when standing still, a control circuit shown in FIG. 13 is unnecessary. Namely, the control device (2f) that is composed of a microcomputer, the data transmission network (100), the outside information input terminal (3b), the shaft angle detection device (2b), the plate angle detection device (1f), the load transducer (1Q), the outside information output terminal (3d), the friction material adjuster (1t), the side to side adjustable motor (1k), the motor (2w), the arch upward supporting member (4a), the motor (2d), the transmission mechanism (2g), and the oil pressure pump (2e) that are shown in FIG. 13 aren't necessarily required.

Simultaneously in the case to control the change of acceleration by making the gross touching area of the plate change and a touching pressure of the plate to a ground change, the friction material adjuster (1t), the bottom opening (1p) and the friction material-supporting member (1R) that is concerned with the friction material (1s) aren't required.

Figure 10:
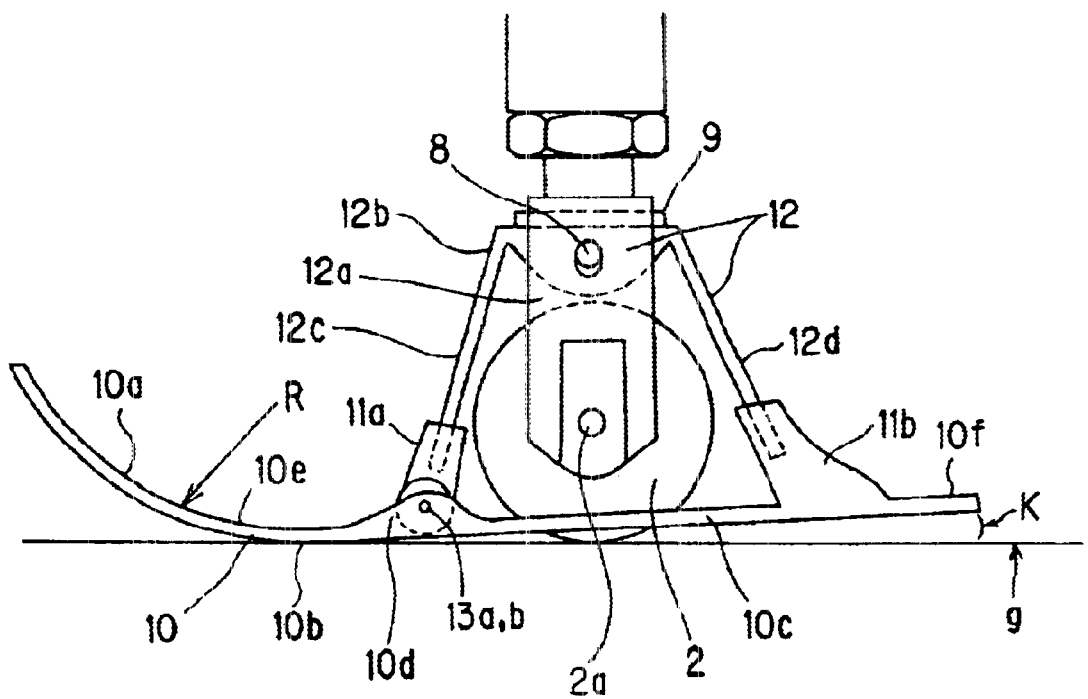
FIG. 10 is a side view that shows substantial parts of the desirable caster for the robot in another embodiment of this invention.
Figure 11:
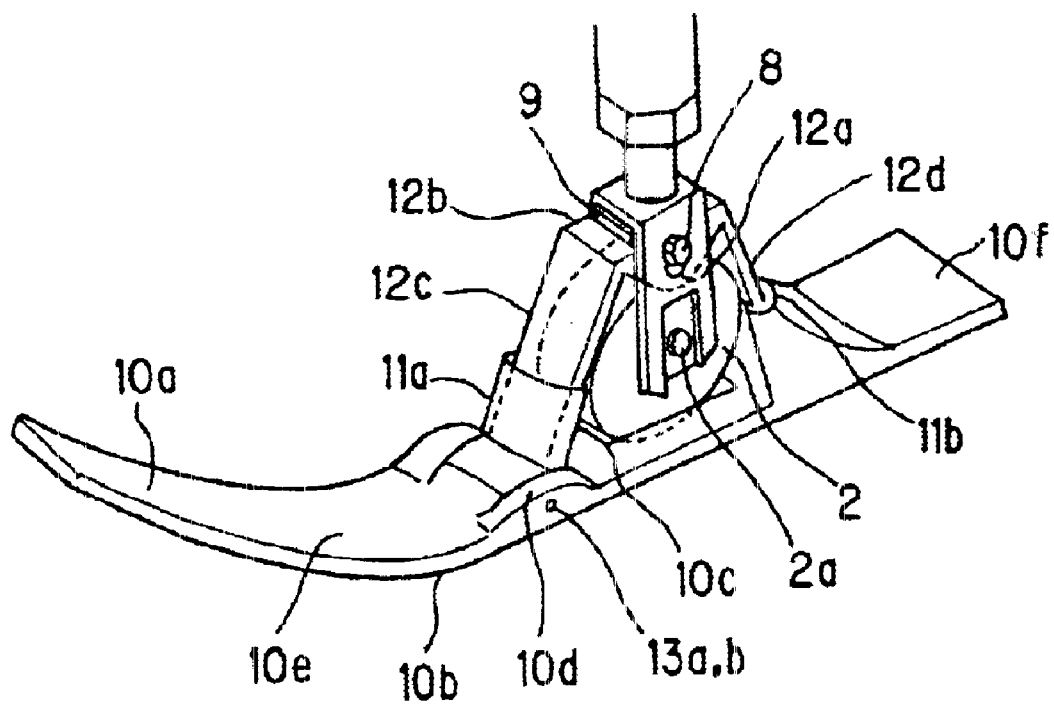
FIG. 11 is a perspective view that shows substantial parts in the other embodiment.

FIG. 10 and FIG. 11 show the desirable caster for a robot of the other embodiment in this invention. As shown in FIG. 10, a plate (10) is individually separated from a side supporting leg (12a) and an upper supporting leg (12b). The plate (10) is formed in the shape of a rectangle with the second flange cut off from a plate (1) and uses flexible materials such as plastic, metals such as aluminum and other materials.

This plate (10) assembles a first flange (10a) so that the first flange is raised in a big bend radius (R) to roughly ⅓ of the entire length. The first flange (10a) is shaped so that it rises from a transit plane (g) with the touching part to the ground (10a) of a plate (10) as starting point. The plate (10) is sloped some degrees of an angle of inclination to the back (K) with the touching part to the ground (10b) as a starting point. The plate (10) is shaped approximately 10 cm in width, 20 cm in length and a 5 mm thick due to maintaining stable movement.

A hole (10c) that is set up approximately in the center of the bottom of the plate (10) is set up like a wheel (2) that is assembled to rotate freely in the upper supporting leg (12b) and which goes through the hole (10c) where the wheel bottom meets a transit plane. A wheel (2) shown in FIG. 10 of which the wheel bottom meets a transit plane is supported by both a side supporting leg (12a) and an axle (2a) of a wheel (2) at the back of the touching part to the ground (10b) of a plate (10).

A side supporting leg (12a), a wheel (2) and an axle (2a) can assemble a motor, an engine and a drive mechanism such as a magnetic drive mechanism. A supporting leg structure (12) shown in FIG. 10 is shaped by separating all of the side supporting leg (12a), the upper supporting leg (12b), the up-down adjustment screw (8), the resilient member (9), the first leg movement adjusting member (11a), and the second leg movement adjusting member (11b). In other words, the side supporting leg (12a) provides a mid-air structure in which a wheel (2) can be stored.

The side of the side supporting leg (12a) is approximately rectangular and the tip of it makes a half-circle. The side supporting leg (12a) is shaped by a material that can support the load of an object such as a utensil or a structure by a plastic or metals and else. The side supporting leg (12a) is located on either side of an upper supporting leg (12b) and is mounted over the top of an upper supporting leg (12b). A side supporting leg (12a) and an upper supporting leg (12b) are fixed by an up-down adjustment screw (8) and a resilient member (9).

An upper supporting leg (12b) and a plate (10) are fixed by a first leg movement adjusting member (11a) and a second leg movement adjusting member (11b). And a lower part of a rolling surface of a wheel (2) that went through a hole (10c) opened in a plate (10) easily touches transit plane (g).

In the embodiment shown in FIG. 10, a plate (10) is fixed to the upper supporting leg (12b) by both the first leg movement adjusting member (11a) and the second leg movement adjusting member (11b). Both the side supporting leg (12a) and the upper supporting leg (12b) are shaped as one set to fix by an up-down adjustment screw (8) and a resilient member (9).

A plate (10) is attached to a front supporting leg (12c) by a first leg movement adjusting member (11a) and is attached to a rear supporting leg (12d) by a second leg movement adjusting member (11b). A plate (10) arranges a hinge carrier (10d) on a plate surface (10e) in order to fix to the front supporting leg (12c) by a first leg movement adjusting member (11a).

A first leg movement adjusting member (11a) is fixed to a hinge carrier (10d) by using a shaft (13a) of a hinge and a shaft stop (13b) in order to fix to a plate (10) in a position of a hinge carrier (10d) and the upper supporting leg (12b) by the front supporting leg (12c) and a first leg movement adjusting member (11a). The front supporting leg (12c) and the first leg movement adjusting member (11a) can be installed with control devices that use oil pressure, air pressure, water pressure, a spring, a wire, an electromotive or magnetic power.

A first leg movement adjusting member (11a) can make a plate (10) adjustable in the front and back based on the movement of a plate (10) by an adjustment of a second leg movement adjusting member (11b) from a hinge carrier (10d) as the starting point. A second leg movement adjusting member (11b) is an up-down variable movement pressure device and is a control device in which oil pressure, air pressure, water pressure, a spring, a wire, an electromotive style and/or magnetic power is used.

The first leg movement adjusting member (11a) and second leg movement adjusting member (11b) could be an up-down variable movement pressure device and incorporates a pressure sensor. When a second leg movement adjusting member (11b) moves variably up and down, it enables a plate (10) to be moved variably to the front and back.

Therefore friction can be controlled by increasing or decreasing the amount of its gross area touching the ground when an end part (10f) of a plate (10) touches the ground in a transit plane (g). Therefore, it can brake without controlling the movement of a wheel by a brake that controls a wheel and/or an axle that holds a wheel of an existent caster.

In the embodiment shown in FIG. 10, a plate (10) is a complete unit with a second leg movement adjusting member (11b) due to it being fixed to the rear supporting leg (12d) by a second leg movement adjusting member (11b). However, a plate (10) can be also made as a separate structure from a second leg movement adjusting member (11b). When a plate (10) and a second leg movement adjusting member (11b) were made separate components, a plate (10) and a second leg movement adjusting member (11b) are fixed by means of a screw stop, glue and weld.

A first leg movement adjusting member (11a) is fixed to a plate (10) by a hinge carrier (10d) at a position of a hinge carrier (10d) on a plate surface (10e) in order to fix the upper supporting leg (12b) by a front supporting leg (12c) that has a structure of a hinge and a first leg movement adjusting member (11a). The front supporting leg (12c) and a first leg movement adjusting member (11a) can be installed with a control device that uses oil pressure, air pressure, water pressure, a spring, rubber, a wire, an electromotive style or magnetic power.

A wheel, whose bottom meets a transit plane from a hole of the plate, is fixed to a supporting leg structure rotating freely. And the wheel, which is held by a supporting leg structure, can change an amount of a gross area touching the ground of a plate increase and decrease due to its up-down movement.

And also the wheel can assemble a drive mechanism. Anything is good for the drive mechanism, such as an engine, a motor, a magnetic propulsion device or nuclear energy.

In the embodiment shown in FIG. 10, a plate (10) and a second leg movement adjusting member (11b) are a complete unit. And the friction can be controlled by a control device of a first leg movement adjusting member (11a) and a second leg movement adjusting member (11b), therefore, the friction can be adjusted, because of this means a side supporting leg (12a), an upper supporting leg (12b), a first leg movement adjusting member (11a), an up-down adjustment screw (8) and a resilient member (9) are fixed respectively to each other.

A resilient member (9) of FIG. 10 is an adjustment material that can move a wheel (2) up and down properly, as illustrated and lies between the side supporting leg (12a) and the upper supporting leg (12b). As for the embodiment, it is a rubber material that can be used as a shock absorber for the side supporting leg (12a) and the upper supporting leg (12b).

A resilient member (9) that consists of the rubber material can be made as a pressure device, such as air pressure or oil pressure. The resilient member (9) could be made with an up-down variable movement pressure device, where a pressure sensor would be included. The resilient member (9) could be made with a front and back variable movement pressure device, where a pressure sensor would be included at the same time. The resilient member (9) can be shaped as a complete unit in either the side supporting leg (12a) and the upper supporting leg (12b).

FIG. 12 as shown is a general idea figure that shows a large wheel as compared to a caster for a robot traveling over obstacles.

USE POSSIBILITY IN INDUSTRY

This invention is for a caster that has higher stability than the existent caster whose movement can be controlled without the use of a brake and is suitable for two pairs of feet in a walking robot. This invention travels easier over obstacles than the existent caster and is suitable for indoor use, whereas an existent caster is limited by the size of a wheel.

What is claimed is:

1. A caster comprising:
    a plate adapted to touch the ground, said plate having a first upward curved end and a second upward curved end, said plate having an opening between the first upward carved end and the second upward curved end;
    a wheel and a support, said wheel being disposed in the opening, said support rotatably supporting the wheel, said support having a shaft adapted to be connected to a device to be transferred;
    an arch member having a top portion, a first end, and a second end, said top portion being movably supported by the support at a position above the wheel wherein an angle of the support with respect to the plate is changeable as the support moves along the arch member, said first end being located between the first upward curved end and the opening, said second end being located between the second upward curved end and the opening; and
    a first socket and a second socket provided on the plate, said first socket receiving the first end of the arch member, said second socket receiving the second end of the arch member, wherein the first socket, the opening, and the second socket are aligned, and the wheel touches the ground through the opening,
    wherein (i) when the first upward curved end is detached from the ground, the wheel and the second upward curved end touch the ground, (ii) when the second upward curved end is detached from the ground, the wheel and the first upward curved end touch the ground, and (iii) when the first upward curved end and the second upward curved end touch the ground, the wheel touches the ground.

2. The caster according to claim 1, wherein the plate has another opening where the first socket is positioned, and the caster further comprises a friction member provided at a bottom of the first socket, said friction member being adapted to touch the ground through the other opening.

3. The caster according to claim 1, wherein the arch member pivots on a point where the top portion of the arch member and the support are connected.

4. The caster according to claim 1, wherein the first end of the arch member and the second end of the arch member pivot sideways on the first socket and the second socket, respectively.

5. A caster comprising:
- a plate adapted to touch the ground, said plate having a front end and a rear end, said front end being upward curved, said plate having an opening between the front end and the rear end;
- a wheel and a support, said wheel being disposed in the opening, said support rotatably supporting the wheel, said support having a shaft adapted to be connected to a device to be transferred;
- a leg member having a top portion, a front leg end, and a rear leg end, said top portion being supported by the support at a position above the wheel, said front leg end being located between the front end of the plate and the opening, said rear leg end being located between the rear end of the plate and the opening; and
- a front socket and a rear socket provided on the plate, said front socket slidably receiving the front leg end, said rear socket slidably receiving the rear leg end, wherein an angle of the support with respect to the plate is changeable as at least one of the front leg end or the rear leg end slides in the front socket or the rear socket, wherein the front socket, the opening, and the rear socket are aligned, and the wheel touches the ground through the opening, wherein (i) when the front end of the plate is detached from the ground, the wheel and the rear end of the plate touch the ground, (ii) when the rear end of the plate is detached from the ground, the wheel and the front end of the plate touch the ground, and (iii) when the front end and the rear end of the plate touch the ground, the wheel touches the ground.

* * * * *